US012587752B2

(12) United States Patent
Horstmeyer et al.

(10) Patent No.: US 12,587,752 B2
(45) Date of Patent: Mar. 24, 2026

(54) TENSORIAL TOMOGRAPHIC FOURIER PTYCHOGRAPHY

(71) Applicant: Duke University, Durham, NC (US)

(72) Inventors: Roarke Horstmeyer, Durham, NC (US); Shiqi Xu, Durham, NC (US); Xiang Dai, Durham, NC (US); Lucas Kreiss, Durham, NC (US); Jadee Neff, Durham, NC (US); Carolyn Glass, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 0 days.

(21) Appl. No.: 18/677,131

(22) Filed: May 29, 2024

(65) Prior Publication Data

US 2024/0406583 A1    Dec. 5, 2024

Related U.S. Application Data

(60) Provisional application No. 63/469,632, filed on May 30, 2023.

(51) Int. Cl.
*H04N 23/951* (2023.01)
*G02B 21/06* (2006.01)
(Continued)

(52) U.S. Cl.
CPC ........... *H04N 23/951* (2023.01); *G02B 21/06* (2013.01); *G02B 21/361* (2013.01);
(Continued)

(58) Field of Classification Search
CPC .... H04N 23/951; G02B 21/06; G02B 21/361; G02B 21/367; G06T 5/10; G06T 5/50;
(Continued)

(56) References Cited

U.S. PATENT DOCUMENTS 6,028,671 A * 2/2000 Svetkoff .......... G01N 21/95684
356/368
10,732,396 B2 8/2020 Kim et al.
(Continued)

FOREIGN PATENT DOCUMENTS

WO        2021172734 A1    9/2021

OTHER PUBLICATIONS

Aidukas, Tomas, et al., "Low-Cost, Sub-Micron Resolution, Wide-Field Computational Microscopy Using Opensource Hardware," Scientific Reports, May 15, 2019 (accessible May 15, 2019), 28 pages, vol. 9, issue 1, article 7457.
(Continued)

*Primary Examiner* — James T Boylan
(74) *Attorney, Agent, or Firm* — Talem IP Law, LLP

(57) ABSTRACT

A Fourier ptychography system includes a polarization-sensitive camera positioned for capturing a sequence of polarized images of a sample, an objective lens positioned in a light path between the polarization-sensitive camera and the sample, an array of light sources for directing light to the sample and a generator polarizer positioned between the array of light sources and the sample to polarize light directed to the sample from the array of light sources. A method of creating a tomographic Fourier ptychography image includes receiving, from a polarization-sensitive camera, a sequence of polarized images of a sample, stitching each image of the sequence of images together using a non-linear Fourier transform function to create a composite image, and outputting the composite image as the tomographic Fourier ptychography image. Each polarized image of the sequence of polarized images overlaps another polarized image of the sequence of polarized images.

20 Claims, 10 Drawing Sheets

(51) Int. Cl.
    *G02B 21/36*      (2006.01)
    *G06T 5/10*       (2006.01)
    *G06T 5/50*       (2006.01)

(52) U.S. Cl.
    CPC .............. *G02B 21/367* (2013.01); *G06T 5/10*
       (2013.01); *G06T 5/50* (2013.01); *G06T*
       *2200/04* (2013.01); *G06T 2207/10016*
       (2013.01); *G06T 2207/10056* (2013.01)

(58) Field of Classification Search
    CPC ....... G06T 2200/04; G06T 2207/10016; G06T
                            2207/10056
    USPC .......................................................... 348/79
    See application file for complete search history.

(56) References Cited

U.S. PATENT DOCUMENTS

| | | | | |
|---|---|---|---|---|
| 11,415,791 | B1 * | 8/2022 | Park ........................ | H04N 23/90 |
| 12,035,057 | B1 * | 7/2024 | Park .................... | G02B 21/367 |
| 2021/0084284 | A1 * | 3/2021 | Mceldowney ....... | H04N 13/257 |
| 2022/0026697 | A1 * | 1/2022 | Doblas .............. | G02B 21/0092 |
| 2022/0117476 | A1 * | 4/2022 | Cha .......................... | A61B 1/04 |
| 2022/0122313 | A1 | 4/2022 | Ozcan et al. | |
| 2022/0380403 | A1 * | 12/2022 | Nguyen ................. | C07H 21/04 |
| 2022/0404267 | A1 | 12/2022 | Park et al. | |
| 2023/0080237 | A1 * | 3/2023 | Mehta ............... | G01N 21/6456 |
| | | | | 250/252.1 |
| 2023/0179876 | A1 * | 6/2023 | Dai ..................... | G02B 21/367 |
| | | | | 348/79 |
| 2023/0204494 | A1 * | 6/2023 | Kumar ...................... | G01J 4/04 |
| | | | | 356/369 |
| 2024/0041323 | A1 * | 2/2024 | Yamaguchi .......... | A61B 3/0008 |
| 2024/0053619 | A1 * | 2/2024 | Porras Aguilar .... | G02B 21/361 |
| 2024/0153616 | A1 * | 5/2024 | Lee ........................ | G06V 10/26 |

OTHER PUBLICATIONS

Aidukas, Tomas, et al., "Phase and Amplitude Imaging with Quantum Correlations through Fourier Ptychography," Scientific Reports, Jul. 18, 2019, 9 pages, vol. 9, issue 1.

Ayoub, Ahmed B., et al., "3D Reconstruction of Weakly Scattering Objects from 2D Intensity-Only Measurements Using the Wolf Transform," Optics Express, Feb. 1, 2021, pp. 3976-3984, vol. 29, issue 3.

Bai, Bijie, et al., "Pathological Crystal Imaging with Single-shot Computational Polarized Light Microscopy," Journal of Biophotonics, Jan. 2020, 13 pages, vol. 13, issue 1, article e201960036.

Baroni, Arthur, et al., "Joint Estimation of Object and Probes in Vectorial Ptychography," Optics Express, Mar. 18, 2019, pp. 8143-8152, vol. 27, issue 6.

Bianco, Vittorio, et al., "Deep Learning-Based, Misalignment Resilient, Real-Time Fourier Ptychographic Microscopy Reconstruction of Biological Tissue Slides," IEEE Journal of Selected Topics in Quantum Electronics, Jul. 2022, pp. 1-10, vol. 28, issue 4.

Both, Martin, et al., "Second Harmonic Imaging of Intrinsic Signals in Muscle Fibers in Situ," Journal of Biomedical Optics, Sep. 1, 2004, pp. 882-892, vol. 9, issue 5.

Chen, Michael, et al., "3D Differential Phase Contrast Microscopy," Biomedical Optics Express, Oct. 1, 2016, pp. 3940-3950, vol. 7, issue 10.

Dai, Xiang, et al., "Quantitative Jones Matrix Imaging Using Vectorial Fourier Ptychography," Biomedical Optics Express, Mar. 1, 2022, pp. 1457-1470, vol. 13, issue 3.

Desai, Harit V., et al., "Cardiac Amyloidosis: Approaches to Diagnosis and Management," Cardiology in Review, Jan. 2010, pp. 1-11, vol. 18, issue 1.

El-Schich, Zahra, et al., "Quantitative Phase Imaging for Label-Free Analysis of Cancer Cells-Focus on Digital Holographic Microscopy," Applied Sciences, Jun. 23, 2018, 16 pages, vol. 8, issue 7, article 1027.

Ferrand, Patrick, et al., "Ptychography in Anisotropic Media," Optics Letters, Nov. 2, 2015, pp. 5144-5147, vol. 40, issue 22.

Ge, Baoliang, et al., "Single-Shot Quantitative Polarization Imaging of Complex Birefringent Structure Dynamics," ACS Photonics, Dec. 15, 2021, pp. 3440-3447, vol. 8, issue 12.

Guo, Syuan-Ming, et al., "Revealing Architectural Order with Quantitative Label-Free Imaging and Deep Learning," eLife, Jul. 27, 2020, 33 pages, vol. 9, article e55502.

Horstmeyer, Roarke, et al., "Diffraction Tomography with Fourier Ptychography," Optica, Aug. 20, 2016, p. 827-35, vol. 3, issue 8.

Hur, Sunwoong, et al., "Polarization-Sensitive Differential Phase-Contrast Microscopy," Optics Letters, Jan. 15, 2021, pp. 392-395, vol. 46, issue 2.

Inoue, Shinya, "Polarization Optical Studies of the Mitotic Spindle: I. The Demonstration of Spindle Fibers in Living Cells," Chromosoma, Dec. 1953, pp. 487-500, vol. 5, issue 1.

Jiang, Shaowei, et al., "Solving Fourier Ptychographic Imaging Problems via Neural Network Modeling and TensorFlow," Biomedical Optics Express, Jul. 1, 2018 (accessible Jun. 25, 2018), pp. 3306-3319, vol. 9, issue 7.

Jiao, Yuheng, et al., "Real-Time Jones Phase Microscopy for Studying Transparent and Birefringent Specimens," Optics Express, Nov. 9, 2020, pp. 34190-34200, vol. 28, issue 23.

Jones, R. Clark, "A New Calculus for the Treatment of Optical Systems I. Description and Discussion of the Calculus," Journal of the Optical Society of America, Jul. 1, 1941, pp. 488-493, vol. 31, issue 7.

Junqueira, L. C. U., et al., "Picrosirius Staining plus Polarization Microscopy, a Specific Method for Collagen Detection in Tissue Sections," The Histochemical Journal, Jul. 1979, pp. 447-455, vol. 11, issue 4.

Kang, Iksung, et al., "Attentional Ptycho-Tomography (APT) for Three-Dimensional Nanoscale X-Ray Imaging with Minimal Data Acquisition and Computation Time," Light: Science & Applications, May 30, 2023, 14 pages, vol. 12, issue 1.

Konda, Pavan Chandra, et al., "Fourier Ptychography: Current Applications and Future Promises," Optics Express, Mar. 30, 2020, pp. 9603-9630, vol. 28, issue 7.

Le Gratiet, Aymeric, et al., "Zebrafish Structural Development in Mueller-Matrix Scanning Microscopy," Scientific Reports, Dec. 27, 2019, 10 pages, vol. 9, issue 1.

Li, Jiaji, et al., "High-Speed in Vitro Intensity Diffraction Tomography," Advanced Photonics, Dec. 28, 2019, 25 pages, vol. 1, issue 06.

Ling, Ruilong, et al., "High-Throughput Intensity Diffraction Tomography with a Computational Microscope," Biomedical Optics Express, May 1, 2018, p. 2130-41, vol. 9, issue 5.

Ling, Tong, et al., "High-Speed Interferometric Imaging Reveals Dynamics of Neuronal Deformation during the Action Potential," Proceedings of the National Academy of Sciences, May 12, 2020, pp. 10278-10285, vol. 117, issue 19.

Liu, Tairan, et al., "Deep Learning-Based Holographic Polarization Microscopy," ACS Photonics, Nov. 18, 2020, pp. 3023-3034, vol. 7, issue 11.

Liu, Teng, et al., "Distinguishing Structural Features between Crohn's Disease and Gastrointestinal Luminal Tuberculosis Using Mueller Matrix Derived Parameters," Journal of Biophotonics, Dec. 2019 (available Oct. 1, 2019), 12 pages, vol. 12, issue 12, article e201900151.

Lodhi, Muhammad Asad, et al., "Inverse Multiple Scattering with Phaseless Measurements," ICASSP 2020—2020 IEEE International Conference on Acoustics, Speech and Signal Processing (ICASSP), May 2020, pp. 1519-1523, IEEE.

Lu, Jin, et al., "Single-Molecule 3D Orientation Imaging Reveals Nanoscale Compositional Heterogeneity in Lipid Membranes," Angewandte Chemie International Edition, Sep. 28, 2020 (available Jul. 9, 2020), pp. 17572-17579, vol. 59, issue 40.

Luo, Jiaxiong, et al., "Fast and Stable Fourier Ptychographic Microscopy Based on Improved Phase Recovery Strategy," Optics Express, May 23, 2022, p. 18505, vol. 30, issue 11.

Mehta, Shalin B., et al., "Polarized Light Imaging of Birefringence and Diattenuation at High Resolution and High Sensitivity," Journal of Optics, Sep. 1, 2013, 22 pages, vol. 15, issue 9, article 094007.

(56)         References Cited

OTHER PUBLICATIONS

Nguyen, Thanh, et al., "Deep Learning Approach for Fourier Ptychography Microscopy," Optics Express, Oct. 1, 2018, p. 26470-84, vol. 26, issue 20.

Oldenbourg, R., "Analysis of Edge Birefringence," Biophysical Journal, Sep. 1991, pp. 629-641, vol. 60, issue 3.

Oldenbourg, Rudolf, "Polarized Light Microscopy: Principles and Practice," Cold Spring Harbor Protocols, Nov. 1, 2013, 14 pages, vol. 2013, issue 11.

Park, Yongkeun, et al., "Quantitative Phase Imaging in Biomedicine," Nature Photonics, Oct. 2018 (accessible Sep. 27, 2018), pp. 578-589, vol. 12, issue 10.

Paszke, Adam, et al., "PyTorch: An Imperative Style, High-Performance Deep Learning Library," Advances in Neural Information Processing Systems, 2019, 12 pages, vol. 32, Curran Associates, Inc.

Pham, Thanh-An, et al., "Versatile Reconstruction Framework for Diffraction Tomography with Intensity Measurements and Multiple Scattering," Optics Express, Feb. 5, 2018, pp. 2749-2763, vol. 26, issue 3.

Pirnstill, Casey W., et al., "Malaria Diagnosis Using a Mobile Phone Polarized Microscope," Scientific Reports, Aug. 25, 2015, 13 pages, vol. 5, issue 1, article 13368.

Quock, Tiffany P., et al., "Epidemiology of AL Amyloidosis: A Real-World Study Using US Claims Data," Blood Advances, May 22, 2018, pp. 1046-1053, vol. 2, issue 10.

Reiser, Michael B., et al., "A Modular Display System for Insect Behavioral Neuroscience," Journal of Neuroscience Methods, Jan. 2008, pp. 127-139, vol. 167, issue 2.

Saba, Amirhossein, et al., "Polarization-Sensitive Optical Diffraction Tomography," Optica, Mar. 20, 2021, pp. 402-408, vol. 8, issue 3.

Schneidereit, Dominik, et al., "An Advanced Optical Clearing Protocol Allows Label-Free Detection of Tissue Necrosis via Multiphoton Microscopy in Injured Whole Muscle," Theranostics, 2021, pp. 2876-2891, vol. 11, issue 6.

Seo, Kyubin, et al., "Symmetry Breaking of hPSCs in Micropattern Generates a Polarized Spinal Cord-like Organoid (pSCO) with Dorsoventral Organization," Sep. 19, 2021, 47 pages.

Shi, Yan, et al., "Monosodium Urate Crystals in Inflammation and Immunity," Immunological Reviews, Jan. 2010 (accessible Dec. 23, 2009), pp. 203-217, vol. 233, issue 1.

Shin, Seungwoo, et al., "Tomographic Measurement of Dielectric Tensors at Optical Frequency," Nature Materials, Mar. 3, 2022, pp. 317-324, vol. 21, issue 3.

Shin, Seungwoo, et al., "Reference-Free Polarization-Sensitive Quantitative Phase Imaging Using Single-Point Optical Phase Conjugation," Optics Express, Oct. 15, 2018, p. 26858-65, vol. 26, issue 21.

Shu, Yefeng, et al., "Adaptive Optical Quantitative Phase Imaging Based on Annular Illumination Fourier Ptychographic Microscopy," Photonix, Oct. 21, 2022, 15 pages, vol. 3, issue 1.

Song, Qinghua, et al., "Ptychography Retrieval of Fully Polarized Holograms from Geometric-Phase Metasurfaces," Nature Communications, May 27, 2020, 8 pages, vol. 11, issue 1, article 2651.

Song, Seungri, et al., "Large-Area, High-Resolution Birefringence Imaging with Polarization-Sensitive Fourier Ptychographic Microscopy," ACS Photonics, Jan. 7, 2021, pp. 158-165, vol. 8, issue 1.

Song, Seungri, et al., "Polarization-Sensitive Intensity Diffraction Tomography," Light: Science & Applications, May 18, 2023 (accessible May 18, 2023), 13 pages, vol. 12, issue 1.

Spiesz, Ewa M., et al., "A Quantitative Collagen Fibers Orientation Assessment Using Birefringence Measurements: Calibration and Application to Human Osteons," Journal of Structural Biology, Dec. 2011, pp. 302-306, vol. 176, issue 3.

Streibl, N., "Three-Dimensional Imaging by a Microscope," Journal of the Optical Society of America A, Feb. 1, 1985, pp. 121-127, vol. 2, issue 2.

Sun, Yu, et al., "Regularized Fourier Ptychography Using an Online Plug-and-Play Algorithm," ICASSP 2019—2019 IEEE International Conference on Acoustics, Speech and Signal Processing (ICASSP), May 2019 (available Nov. 2, 2018), 8 pages, IEEE.

Tadayon, Maryam, et al., "The Mantis Shrimp Saddle: A Biological Spring Combining Stiffness and Flexibility," Advanced Functional Materials, Nov. 2015 (available Sep. 24, 2015), pp. 6437-6447, vol. 25, issue 41.

Taddese, Asemare Mengistie, et al., "Jones Tomographic Diffractive Microscopy with a Polarized Array Sensor," Optics Express, Feb. 27, 2023, p. 9034-51, vol. 31, issue 5.

Van Rooij, Jos, et al., "Polarization Contrast Optical Diffraction Tomography," Biomedical Optics Express, Apr. 1, 2020, p. 2109-21, vol. 11, issue 4.

Weyl, H., "Eine Neue Erweiterung Der Relativitatstheorie," Annalen Der Physik, Jan. 1919, pp. 101-133, vol. 364, issue 10.

Xu, Shiqi, et al., "Tensorial Tomographic Differential Phase-Contrast Microscopy," 2022 IEEE International Conference on Computational Photography (ICCP), Aug. 1, 2022, pp. 1-11, IEEE.

Yang, Bin, et al., "Polarized Light Microscopy for 3-dimensional Mapping of Collagen Fiber Architecture in Ocular Tissues," Journal of Biophotonics, Aug. 2018, 19 pages, vol. 11, issue 8, article e201700356.

Yang, Liming, et al., "Lensless Polarimetric Coded Ptychography for High-Resolution, High-Throughput Gigapixel Birefringence Imaging on a Chip," Photonics Research, Dec. 1, 2023, p. 2242-55, vol. 11, issue 12.

Yang, Xi, et al., "Quantized Fourier Ptychography with Binary Images from SPAD Cameras," Photonics Research, Oct. 1, 2021, p. 1958-69, vol. 9, issue 10.

Yeh, Li-Hao, et al., "uPTI: Uniaxial Permittivity Tensor Imaging of Intrinsic Density and Anisotropy," Biophotonics Congress 2021, Sep. 12, 2021 (accessible Jul. 20, 2020), 52 pages, Optica Publishing Group.

Zhang, Ke, et al., "Using Fourier Ptychography Microscopy to Achieve High-Resolution Chromosome Imaging: An Initial Evaluation," Journal of Biomedical Optics, Jan. 31, 2022, 11 pages, vol. 27, issue 01.

Zhanghao, Karl, et al., "High-Dimensional Super-Resolution Imaging Reveals Heterogeneity and Dynamics of Subcellular Lipid Membranes," Nature Communications, Nov. 18, 2020, 10 pages, vol. 11, issue 1.

Zhou, Kevin C., et al., "Diffraction Tomography with a Deep Image Prior," Optics Express, Apr. 27, 2020, p. 12872-96, vol. 28, issue 9.

Li, Jiaji, et al., "Transport of Intensity Diffraction Tomography with Non-Interferometric Synthetic Aperture for Three-Dimensional Label-Free Microscopy," Light: Science & Applications, Jun. 2, 2022, 14 pages, vol. 11, issue 1, article 154.

Chowdhury, Shwetadwip, et al., "High-Resolution 3D Refractive Index Microscopy of Multiple-Scattering Samples from Intensity Images," Optica, Sep. 20, 2019 (accessible Sep. 16, 2019), p. 1211-19, vol. 6, issue 9.

Wakefield, Devin L., et al., "Cellular Analysis Using Label-Free Parallel Array Microscopy with Fourier Ptychography," Biomedical Optics Express, Mar. 1, 2022 (accessible Feb. 7, 2022), pp. 1312-1327, vol. 13, issue 3.

Harfouche, Mark, et al., "Imaging across Multiple Spatial Scales with the Multi-Camera Array Microscope," Optica, Apr. 20, 2023 (accessible Apr. 6, 2023), pp. 471-480, vol. 10, issue 4.

Thomson, Eric E., et al., "Gigapixel Imaging with a Novel Multi-Camera Array Microscope," eLife, Dec. 14, 2022, pp. 1-47, vol. 11, article e74988.

Yang, Xi, et al., "Multi-Modal Imaging Using a Cascaded Microscope Design," Optics Letters, Apr. 1, 2023 (accessible Mar. 22, 2023), pp. 1-5, vol. 48, issue 7.

Yao, Xing, et al., "Increasing a Microscope's Effective Field of View via Overlapped Imaging and Machine Learning," Optics Express, Jan. 17, 2022 (accessible Jan. 6, 2022), pp. 1745-1761, vol. 30, issue 2.

Dai, Xiang, et al., "Towards a Vectorial Treatment of Fourier Ptychographic Microscopy," Imaging and Applied Optics Congress, Jun. 2020, 2 pages, Paper CF2C.3, Optica Publishing Group.

* cited by examiner 200
204
206
202
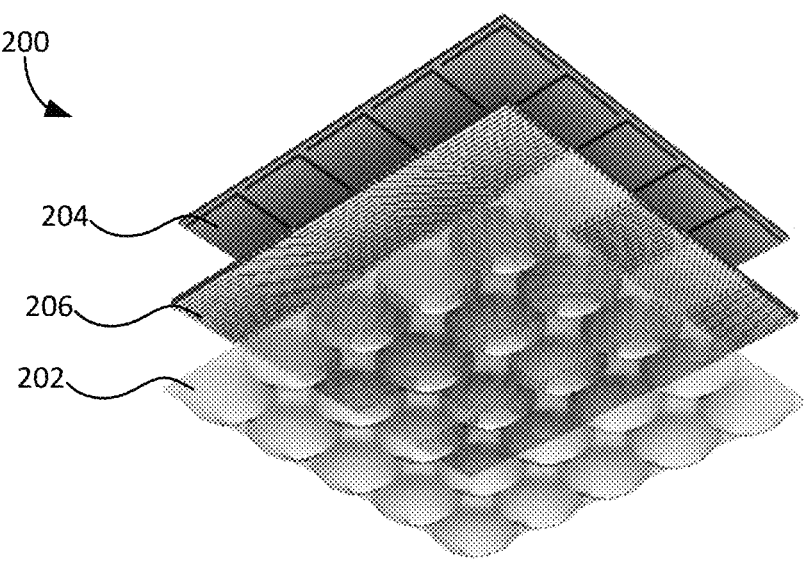
Figure 2
300
310
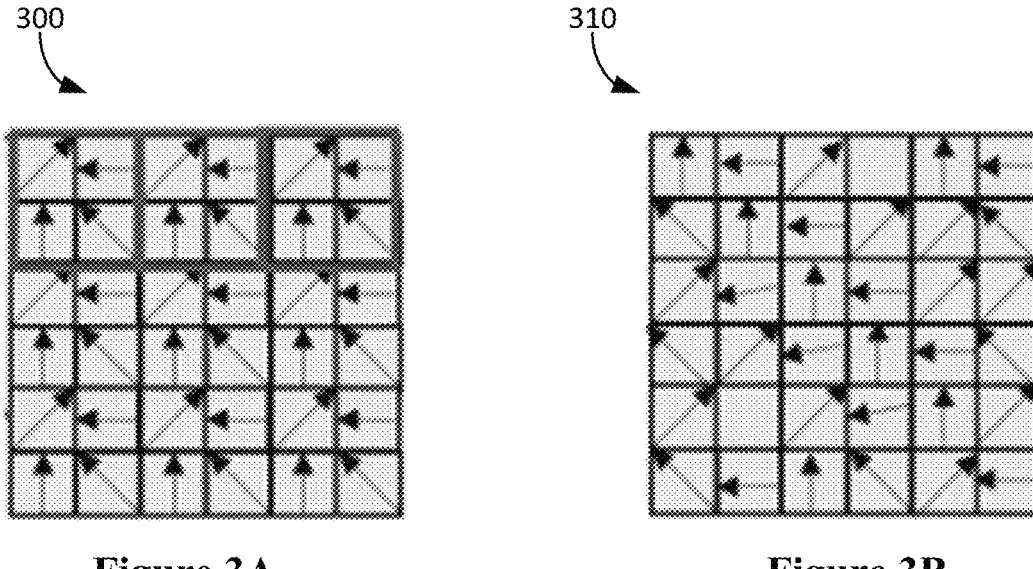
Figure 3A                 Figure 3B

600

602

604

Computing System 630

System Controller 620

LED Controller 622

630

640

638

Storage 632

Instructions

User Interface 636

Processor 631

Communications Interface 634

TENSORIAL TOMOGRAPHIC FOURIER PTYCHOGRAPHY

CROSS-REFERENCE TO RELATED APPLICATIONS

This application claims the benefit of U.S. Provisional Application Ser. No. 63/469,632, filed May 30, 2023.

BACKGROUND

Quantitative phase imaging (QPI) is a well-known label-free microscopy approach that can detect phase delay introduced by semi-transparent cells and tissues. Due in part to QPI's ability to provide quantitative information about primarily transparent biological specimens with low phototoxicity, QPI has become and invaluable took in scientific and clinical studies, including monitoring for neuronal firing and cancer cell line detection. Besides scalar phase contrast, transparent specimens also exhibit alternative and important endogenous optical contrast mechanisms, including anisotropic properties such as material birefringence and orientation. Indeed, the orientation of molecular arrangements in lipid membranes can now be quantitatively monitored with polarization-sensitive microscope arrangements, including early analog designs, differential interference contrast methods, and contemporary digital approaches that reconstruct quantitative specimen retardance and orientation. These methods have been applied to study small model organisms and to assist clinical diagnosis.

Recently, there has been increased interest in measuring polarization-sensitive phase information from specimens. In general, polarization-sensitive quantitative phase imaging (PS-QPI) methods can be divided into two categories: those that rely on interferometric detection, and those that utilize computational phase retrieval methods. Interferometric methods (e.g., off-axis holography) can create polarization-sensitive phase images with as few as a single measurement, and can be extended to 3D with diffraction tomography approaches. While often impressive, these methods usually require complex arrangements of coherent laser illumination and careful system alignment, which sets additional design requirements for use in clinical applications.

Computational phase retrieval methods, on the other hand, rely on image reconstruction algorithms that convert multiple intensity measurements into phase-sensitive outputs, and can be implemented with less expensive hardware. Due to their simple instrumentation, computational polarization microscopes have been increasingly applied to image biological samples, for instance, to study white matter tracts within whole brain slices and to diagnose malaria from blood smears. Furthermore, these methods have been extended to image 3D samples, such as axons and cardiac tissue with axial scanning. Thick samples such as organoids and tissue slices also naturally have intriguing 3D structures that can include anisotropic material. Creating high-resolution volumetric representations of the polarization properties of these samples is essential to studying biology and pathology. While tomographic imaging methods such as confocal-based approaches have been developed in the past to image muscle tissue and neural organoids, for instance, there remain relatively few microscopic techniques to jointly capture quantitative phase and anisotropy across a large three-dimensional volume at high resolution. One recent study attempted to create 3D anisotropy maps using off-axis LED illumination but did not provide tomographic permittivity matrix reconstructions.

BRIEF SUMMARY

The systems and methods described herein provide a non-scanning polarization-sensitive tomography, termed tensorial tomographic Fourier ptychography. Advantageously, the systems and methods described herein provide quantitative volumetric permittivity matrix reconstructions without any moving parts, allowing these relatively low-cost systems and methods to create a tomographic Fourier ptychography image that resolve details (e.g., fine filament structure in tissues) and are consistent with one of the old standards in imaging (i.e., second harmonic images). Indeed, using relatively low-NA objectives, the described systems and methods for tensorial tomographic Fourier ptychography polarization-sensitive tomographic reconstruction for various calibration samples and biological specimens provide reconstructed volumetric permittivity metrics based on computation illumination strategies to record polarized measurements and retrieve phase information.

A Fourier ptychography system includes a polarization-sensitive camera positioned for capturing a sequence of polarized images of a sample, an objective lens positioned in a light path between the polarization-sensitive camera and the sample, an array of light sources for directing light to the sample and a generator polarizer positioned between the array of light sources and the sample to polarize light directed to the sample from the array of light sources.

A method of creating a tomographic Fourier ptychography image includes receiving, from a polarization-sensitive camera, a sequence of polarized images of a sample in a light path that passes through a generator polarizer, the sample, and an objective lens, stitching each image of the sequence of images together using a non-linear Fourier transform function to create a composite image, and outputting the composite image as the tomographic Fourier ptychography image. Each polarized image of the sequence of polarized images overlaps another polarized image of the sequence of polarized images.

In some cases, stitching each polarized image of the sequence of polarized images together using the non-linear Fourier transform function includes measuring an amplitude of each polarized image of the sequence of polarized images, estimating a guess amplitude and a guess phase for each polarized image of the plurality of polarized images in a Fourier space, generating a simulated image by using the guess amplitude and the guess phase for each polarized image of the sequence of polarized images using an inverse Fourier transform function, updating the simulated image by replacing the guess amplitude with the measured amplitude for each polarized image of the sequence of polarized images, and reverting the updated simulated image to the Fourier space by applying a Fourier transform to the updated simulated image for each polarized image of the sequence of polarized images This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 illustrates a polarization-sensitive camera used in a Fourier ptychography system.

FIGS. 3A and 3B illustrate generator polarizer arrays.

DETAILED DESCRIPTION

The systems and methods described herein provide a non-scanning polarization-sensitive tomography, termed tensorial tomographic Fourier ptychography. Advantageously, the systems and methods described herein provide quantitative volumetric permittivity matrix reconstructions without any moving parts, allowing these relatively low-cost systems and methods to create a tomographic Fourier ptychography image that resolve fine filament structure in tissues and are consistent with one of the old standards in imaging (i.e., second harmonic images). Indeed, using relatively low-NA objectives, the described systems and methods for tensorial tomographic Fourier ptychography polarization-sensitive tomographic reconstruction for various calibration samples and biological specimens provide reconstructed volumetric permittivity metrics based on computation illumination strategies to record polarized measurements and retrieve phase information.

Figure 1A:
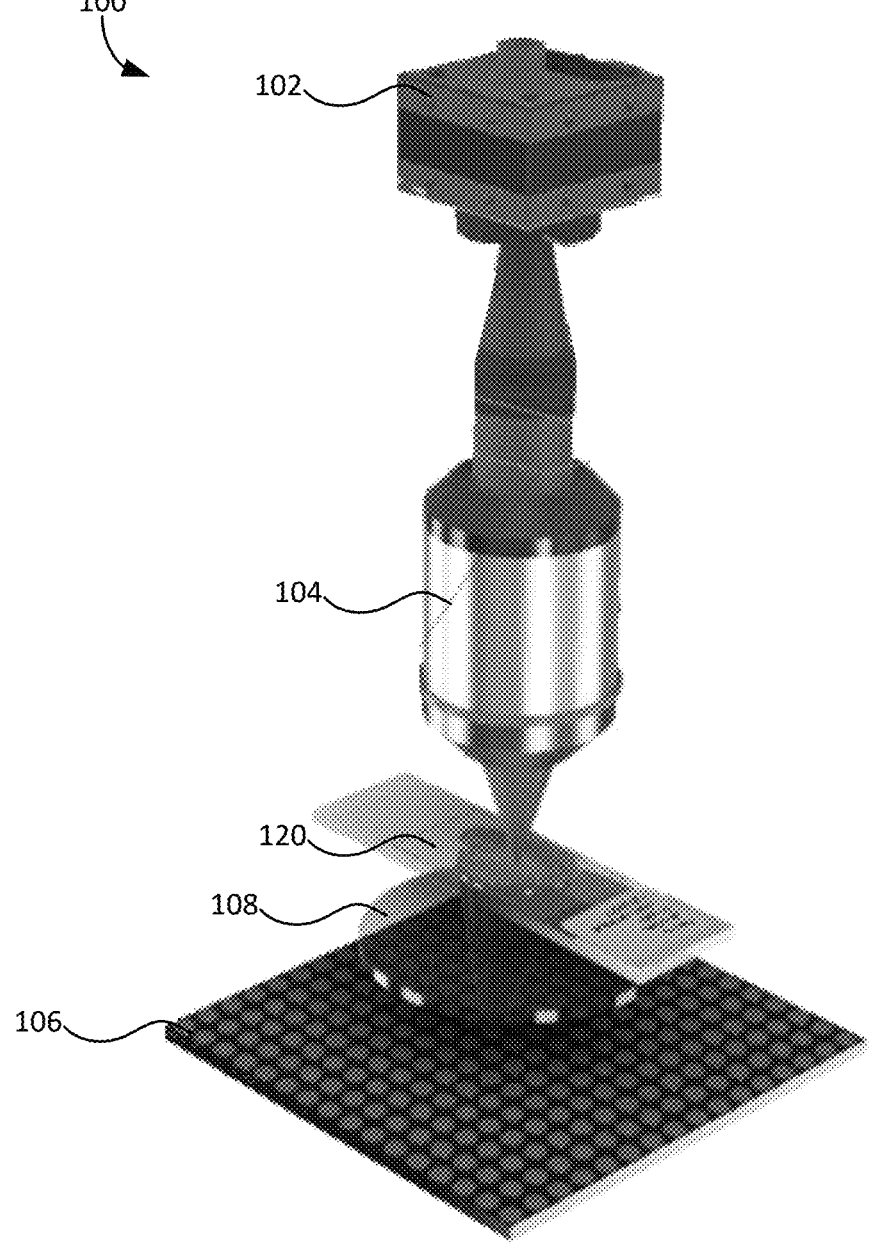
FIGS. 1A and 1B illustrate tomographic Fourier ptychography systems.
Figure 1B:
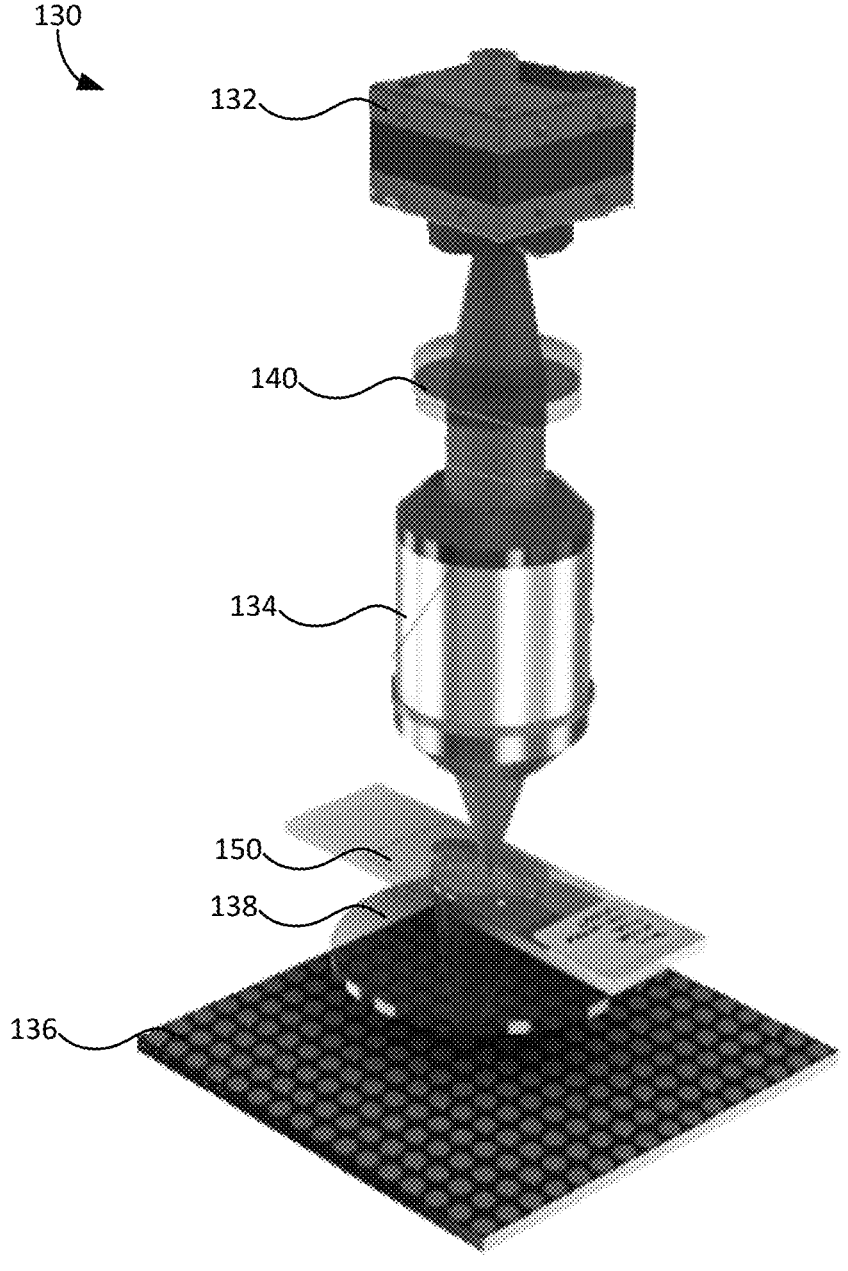

FIGS. 1A and 1B illustrate tomographic Fourier ptychography systems. Referring to FIG. 1A, a Fourier ptychography system 100 includes a polarization-sensitive camera 102 positioned for capturing a sequence of polarized images of a sample 120, an objective lens 104 positioned in a light path between the polarization-sensitive camera 102 and the sample 120, an array of light sources 106 for directing light to the sample 120, and a generator polarizer 108 positioned between the array of light sources and the sample to polarize light directed to the sample 120 from the array of light sources 106.

Referring to FIG. 1B, a Fourier ptychography system 130 includes a polarization-sensitive camera 132, an objective lens 134, an array of light sources 136, and a generator polarizer 138 (e.g., in the same or similar configuration as the Fourier ptychography system 100 of FIG. 1A). The Fourier ptychography system 130 further includes a tube lens 140 positioned between the objective lens 134 and the polarization-sensitive camera 132.

Referring to FIGS. 1A and 1B, in some cases, the generator polarizer 108/138 is a left-circular polarizer. In some cases, the generator polarizer 108/138 is a generator polarizer array (e.g., as illustrated in FIGS. 3A and 3B) and can be optimized based on the type of the sample. In some cases, the array of light sources 106/136 is an LED array. In some cases, the Fourier ptychography system 100/130 further includes a controller configured to sequentially turn on LEDs of the LED array (e.g., turning one or more LEDs of the LED array on while turning the remaining LEDs of the LED array off). In some cases, the Fourier ptychography system 100/130 further includes a voltage level shifter to adjust voltage applied to the LED array. In some cases, the Fourier ptychography system 100/130 further includes a data interface (not illustrated) for outputting the sequence of polarized images of the sample 120/150. In some cases, the array of light sources 106/136 is an array of individual lighting elements. In some cases, the Fourier ptychography system 100/130 further includes a controller configured to sequentially turn on the individual lighting elements of the array of individual lighting elements. In some cases, the Fourier ptychography system 100/130 further includes a voltage level shifter to adjust voltage applied to individual lighting elements of the array of individual lighting elements.

FIG. 2 illustrates a polarization-sensitive camera used in a Fourier ptychography system. Referring to FIG. 2, a polarization-sensitive camera 200 (e.g., polarization-sensitive camera 102/132 of FIGS. 1A and/or 1B) includes a microlens array 202, a sensor 204, and a wire-grid polarizer 206 positioned between the microlens array 202 and the sensor 204. It should be understood that this is an example of a polarization-sensitive camera and that other configurations of polarization-sensitive cameras may be suitable for the systems and methods described herein.

FIGS. 3A and 3B illustrate generator polarizer arrays. Referring to FIG. 3A, a periodic mosaic polarizer array 300 having a repeating pattern is illustrated. Referring to FIG. 3B, an optimized mosaic polarizer array 310 is illustrated and is optimized based on a type of the sample (e.g., tissue sample, crystalline sample, minerals). In some cases, the optimized mosaic polarizer array 310 is optimized based on phase and quantitative 3D measurements that provide higher light scattering (thereby changing the polarization) through the sample. In some cases, a generator polarizer array (e.g., 300 and/or 310) provides one or more specific polarization response/state for the sample, such as bi-refringence, di-attenuation, and/or orientation. In some cases, the generator polarizer array includes a combination of polarization responses/states for the sample. In some cases, the generator polarizer array includes a specific polarization response/state for the sample by placing a specific polarization response/state over each light source of the array of light sources (e.g., LED of an LED array), such that the entire area of the sample is captured by the polarization-sensitive camera for each specific polarization response/state. When using a generator polarizer array, the information from each polarization response/state can be combined during the image reconstruction process to create the tomographic Fourier ptychography image(s) with one or more polarization responses/states.

Figure 4:
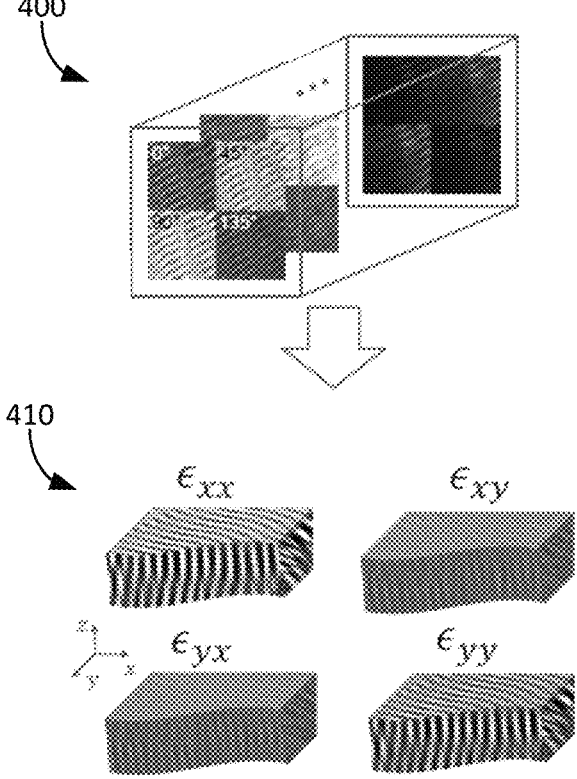
FIG. 4 illustrates intensity measurements that are fused to form volumetric sample permittivity tensor reconstructions.
Figure 5:
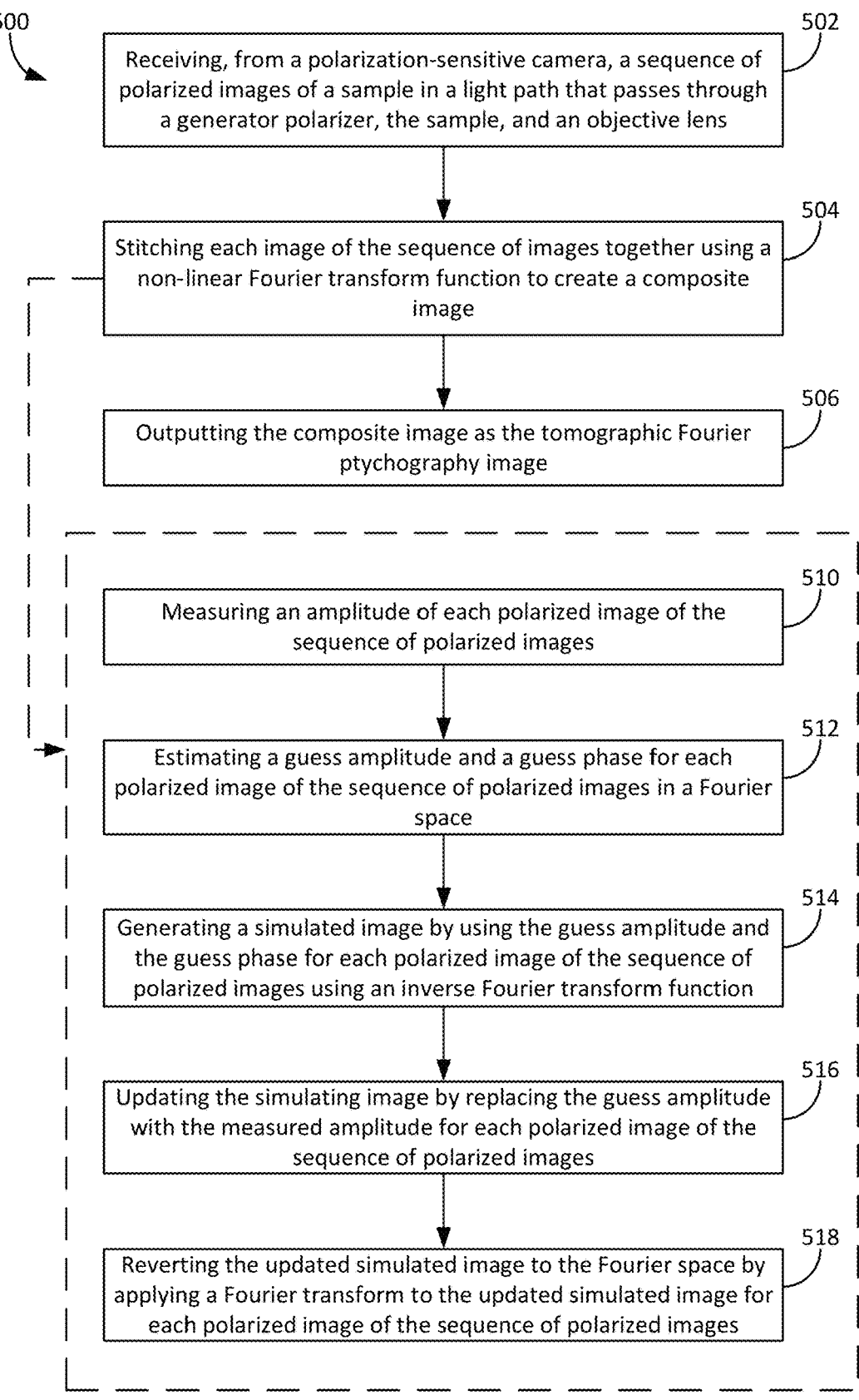
FIG. 5 illustrates a method of creating a tomographic Fourier ptychography image.

FIG. 4 illustrates intensity measurements that are fused to form volumetric sample permittivity tensor reconstructions. Referring to FIG. 4, a sequence of polarized images 400 of a sample are captured (e.g., using the system described above) and, using the method 500 described below with respect to FIG. 5, are used to create three-dimensional tomographic Fourier ptychography images 410. Specifically, the sequence of polarized images 400 are captured using polarized light intensity (e.g., from an LED array and passed through a generator polarizer) at 0°, 45°, 90°, and 135° and are fused to form volumetric sample permittivity tensor reconstructions of the sample (e.g., the tomographic Fourier ptychography images 410).

FIG. 5 illustrates a method of creating tomographic Fourier ptychography image. Referring to FIG. 5, the method 500 of creating a tomographic Fourier ptychography image includes receiving (502), from a polarization-sensitive camera, a sequence of polarized images of a sample in a light path that passes through a generator polarizer, the sample, and an objective lens, stitching (504) each image of the sequence of images together using a non-linear Fourier transform function to create a composite image, and outputting (506) the composite image as the tomographic Fourier ptychography image. Each polarized image of the sequence of polarized images overlaps another polarized image of the sequence of polarized images.

In some cases, each polarized image of the sequence of polarized images includes a mix of at least four different polarized light amplitudes (e.g., with each pixel of the composite image having the at least four different polarized light amplitudes). In some cases, the method 500 further includes de-mixing each polarized image of the sequence of polarized images for an amplitude of each of the four different polarized light amplitudes. For example, a system (e.g., system 100/130 of FIGS. 1A and 1B) can include a generator polarizer array and an array of light sources (e.g., LED array). Each image of the received (502) sequence of polarized light images can include four different polarized light amplitudes from the system turning on one or more lighting elements of the array of light sources (e.g., LEDs of the LED array) and having that light pass through one or more different polarization states in the generator polarizer array (resulting in the at least four different polarized light amplitudes) and ultimately captured by the polarization-sensitive camera. Accordingly, each of the at least four different polarized light amplitudes can then be de-mixed to determine each respective amplitude. It should be understood that this process may be included and/or in addition to other steps of the method 500 described herein. In some cases, each polarized image of the sequence of polarized images includes a mix of at least nine different polarized light amplitudes.

In some cases, stitching (504) each polarized image of the sequence of polarized images together using the non-linear Fourier transform function includes measuring (510) an amplitude of each polarized image of the sequence of polarized images, estimating (512) a guess amplitude and a guess phase for each polarized image of the plurality of polarized images in a Fourier space, generating (514) a simulated image by using the guess amplitude and the guess phase for each polarized image of the sequence of polarized images using an inverse Fourier transform function, updating (516) the simulated image by replacing the guess amplitude with the measured amplitude for each polarized image of the sequence of polarized images, and reverting (518) the updated simulated image to the Fourier space by applying a Fourier transform to the updated simulated image for each polarized image of the sequence of polarized images. In some cases, the updated simulated image for each polarized image of the sequence of polarized images is then stitched together to form the composite image.

In some cases, applying the Fourier transform to the updated simulated image for each polarized image of the sequence of polarized images correspondingly updates the guess phase and the measured amplitude from the updated simulated image. In some cases, the method 500 further includes iteratively repeating the generating (514) step, the updating (516) step, and the reverting (518) step until the sequence of polarized images converges as a high-resolution composite image (e.g., when stitched together). In some cases, in the iteratively repeating generating (514) step, a prior updated measured amplitude is used as the guess amplitude and a prior updated guess phase is used as the guess phase.

Figures 7A, 7B, 7C, 7D, 7E, 7F:
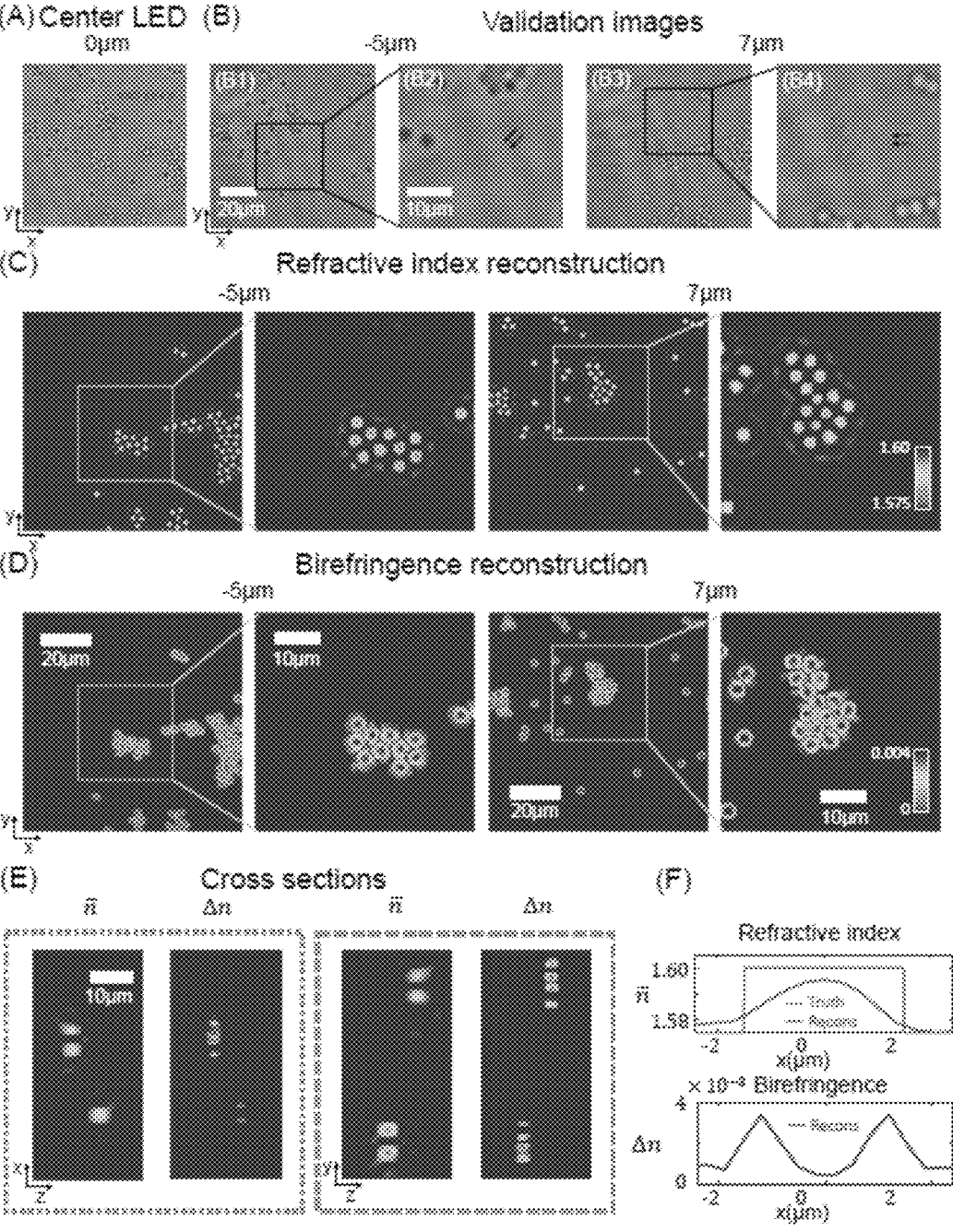
FIGS. 7A-7F illustrate tomographic Fourier ptychography images of polystyrene microspheres.

In some cases, each polarized image of the sequence of polarized images overlaps another polarized image of the sequence of polarized images by at least 75%. In some cases, the composite image is three-dimensional (e.g., as illustrated in FIG. 7F).

Figure 6A:
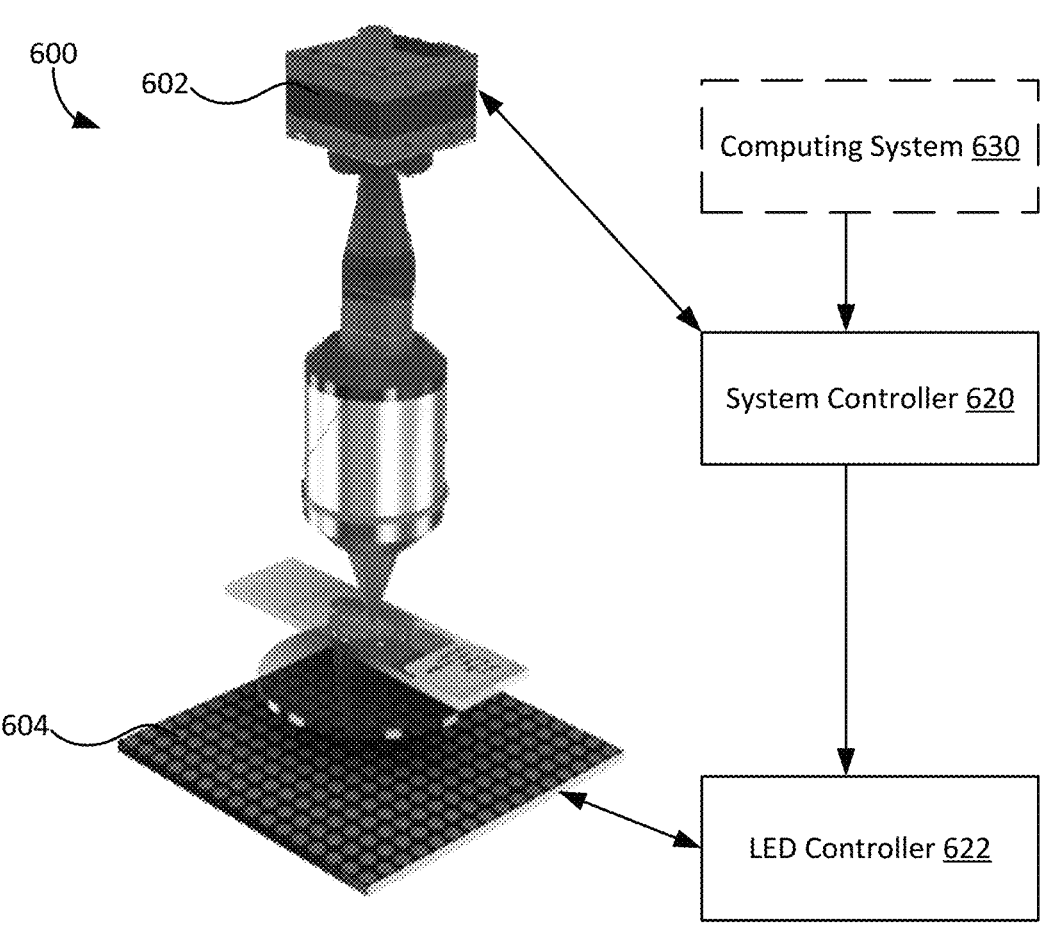
FIG. 6A illustrate a system controller for implementing functionality of a tomographic Fourier ptychography system.

FIG. 6A illustrates a system controller for implementing functionality of a tomographic Fourier ptychography system. Referring to FIG. 6A, a tomographic Fourier ptychography system 600 can include a system controller 620 coupled to a polarization-sensitive camera 602. In some cases, the system controller 620 can include or be coupled to a computing system 630 for creating tomographic Fourier ptychography images. System controller 620 can include one or more processors with corresponding instructions for execution and/or control logic for controlling the tomographic Fourier ptychography system 100, including the polarization-sensitive camera 602 and, in some cases, the LED(s) 604 (e.g., timing information for capturing a sequence of polarized images by the polarization-sensitive camera 602 and/or timing information for turning on and off LED(s) 604). The sequence of polarized images captured by the polarization-sensitive camera 602 can be processed at the system controller 620 or communicated to the computing system 630 via a communications interface. In some cases, the system controller 620 performs the method 500. The tomographic Fourier ptychography system 600 can further include an LED controller 622 that provides timing, voltage, and/or current information to the LED(s) 604. In some cases, the LED controller 622 includes a voltage lever shifter for supplying the voltage to the LED(s) 604.

Figure 6B:
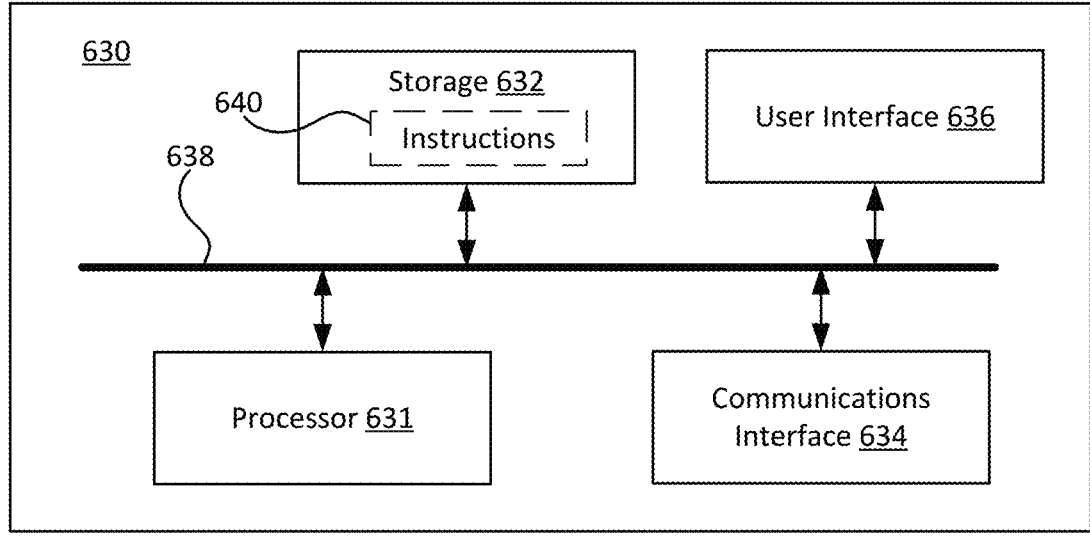
FIG. 6B illustrates a computing system that can be used for a tomographic Fourier ptychography system.

FIG. 6B illustrates a computing system that can be used for a tomographic Fourier ptychography system. Referring to FIG. 6B, a computing system 630 can include a processor 631, storage 632, a communications interface 634, and a user interface 636 coupled, for example, via a system bus 638. Processor 631 can include one or more of any suitable processing devices ("processors"), such as a microprocessor, central processing unit (CPU), graphics processing unit (GPU), field programmable gate arrays (FPGAs), application-specific integrated circuits (ASICs), logic circuits, state machines, application-specific standard products (ASSPs), system-on-a-chip systems (SOCs), complex programmable logic devices (CPLDs), etc. Storage 632 can include any suitable storage media that can store instructions 640 for generating tomographic Fourier ptychography images from the sequence of polarized images received from the polarization-sensitive camera as well as the method 500. Suitable storage media for storage 632 includes random access memory, read only memory, magnetic disks, optical disks, CDs, DVDs, flash memory, magnetic cassettes, magnetic tape, magnetic disk storage or other magnetic storage devices, or any other suitable storage media. As used herein "storage media" do not consist of transitory, propagating waves. Instead, "storage media" refers to non-transitory media.

Communications interface 634 can include wired or wireless interfaces for communicating with a system controller (e.g., system controller 620 of FIG. 6A) as well as interfaces for communicating with the "outside world" (e.g., external networks). User interface 636 can include a display on which the tomographic Fourier ptychography images can be displayed as well as suitable input device interfaces for receiving user input (e.g., mouse, keyboard, microphone).

Laboratory Testing

Setup

The imaging setup of tensorial tomographic Fourier ptychography (T²oFu) included an array of 15×15 addressable LEDs (μInventions Inc; Portugal) and a left-circular polarizer (CP42HE; Edmund Co., USA). A 521 nm wavelength light from the LED array was circularly polarized and illuminated the 3D sample from different angles. A microcontroller (ARM Cortex-M3) and a voltage level shifter (SN74AHCT) were used to turn on each small LED pixel (WS2812b-2020) sequentially. The optical field then passed through an optical system consisting of an infinity-corrected objective lens (0.25 NA or 0.4 NA, Plan Achromatic; Olympus, JP) and a tube lens (Achromatic Doublets, 180 mm focal length; Thorlabs, Inc, USA). The largest illumination NA ($NA_{illum}$) was chosen to match the native NA of the objective ($NA_{obj}$). Hence, the theoretical lateral and axial resolutions are $$\delta_{x,y} = \lambda/2(NA_{obj} + NA_{illum}) \text{ and } \delta_z = \lambda/\left(2 - \sqrt{1 - NA_{obj}^2} - \sqrt{1 - NA_{illum}^2}\right)$$

respectively. For the 0.25 NA system, $\delta_{x,y}$=5.2 μm and $\delta_z$=8.2 μm. For the 0.4 NA system, $\delta_{x,y}$=3.2 μm and $\delta_z$=3.1 μm. The intensity image was captured with a polarization-sensitive CMOS camera (BFS-U3-51S5P; Teledyne FLIR LLC; USA). The polarization camera analyzed the light orientated at four different polarizations (0°; 45°; 90°; and 135°), achieved by placing 2×2 wire-grid polarizers between the pixel array/sensor and the microlens array (e.g., see FIG. 2).

Notation

The inventors note that → and $\bar{\phantom{x}}$ symbols to denote vectors and matrices for variables, respectively. By default, all of the vectors are column vectors. The inventors utilized the Mathematical Script font enclosed in curly braces to denote spatial operators (e.g., F{•}, which indicates the Fourier transform in space). Bold letters in lowercase represent support vectors in either frequency (u) or space (r). The $\bar{\phantom{x}}$ symbol is used to denote the frequency-domain counterparts of variables previously defined in the space domain, such as $\tilde{I}(u) = \mathcal{F}\{I(r)\}$.

Vectorial Light Propagation

The optical properties of a 3D sample can be described by its 3×3 permittivity matrix:

$$\bar{\bar{\epsilon}} = \begin{bmatrix} \epsilon_{xx}(r) & \epsilon_{xy}(r) & \epsilon_{xz}(r) \\ \epsilon_{yx}(r) & \epsilon_{yy}(r) & \epsilon_{yz}(r) \\ \epsilon_{zx}(r) & \epsilon_{zy}(r) & \epsilon_{zz}(r) \end{bmatrix}, \tag{1}$$

where r=(x,y,$z$) is the voxel position in space. The first Born approximation is adopted and the scattered vectorial electric field $\vec{E}^s$ and illumination $\vec{E}^0$ is related as:

$$\vec{E}^s(r) = \int\int\int \bar{\bar{G}}(r-r')\bar{V}(r')\vec{E}^0(r')dr', \tag{2}$$

where $V(r')=\bar{\bar{\epsilon}}-\bar{\bar{\epsilon}}_0$ is the sample scattering potential tensor with $\bar{\bar{\epsilon}}_0$ as the permittivity tensor of the background medium. $\bar{\bar{G}}(r)$ is the dyadic Green's tensor. In addition, the inventors used illuminations with relatively small incident angles, which have weak polarization along the z-axis. Therefore, the inventors mainly considered the transverse polarization of the electrical field $\vec{E}_\perp = (E_x, E_y)^T$, which will be discussed in more detail below. The intensities of the vectorial electric field $\vec{E}_\perp$ at different orientations were then analyzed and recorded by a polarization-sensitive optical imaging system, which was modeled as a 2×2 pupil matrix at each spatial frequency u. Therefore, the measured intensity under plane wave illumination with angle u' analyzed by a polarizer with Jones vector $\vec{a}$ is:

$$I'(r, u') = \left| \vec{a}_l^T \mathcal{F}_{2d}^{-1} \left\{ \bar{\bar{P}}(u)\mathcal{F}_{2d}\left\{ \vec{E}_\perp^S(r, u') + \vec{E}_\perp^0(r, u') \right\} \right\} \right|^2 \tag{3}$$

For a linear polarization analyzer orientated at α, a=[cos α, sin α]$^T$, the light can only oscillate in the same direction as the linear polarizer.

Forward Model and Inverse Problem

For the initial demonstration of T²oFu, the inventors modified the model described above under "Vectorial light propagation" by making certain approximations. The objective of this was to craft a meaningful forward model that accurately describes the experimental measurements, whose inverse problem is less ill-posed. First, the inventors began with a paraxial approximation, which assumes weak polarization along the optical axis of the illumination and negligible interaction between traverse and axial polarization from the sample. With this, the inventors simplified the 3×3 permittivity matrix to a 2×2 matrix, denoted as:

$$\bar{\bar{\epsilon}} = \begin{bmatrix} \epsilon_{xx}(r) & \epsilon_{xy}(r) \\ \epsilon_{yx}(r) & \epsilon_{yy}(r) \end{bmatrix} \tag{4}$$

While this approximation may not always be accurate for every anisotropic sample when illuminated at high angles, this approximation is accurate up to a 25° oblique illumination based on a study using finite element analysis. Additionally, the inventors assumed the background media is isotropic and uniform (i.e., not spatially dependent) with a diagonal permittivity tensor $\bar{\bar{\epsilon}}_0 = \bar{\bar{\epsilon}}_0 II$. This simplified Green's tensor to a diagonal matrix with the same component for each polarization, $$\bar{\bar{G}}(r, r') = \begin{bmatrix} G(r, r') & 0 \\ 0 & G(r, r') \end{bmatrix} \tag{5}$$

$\bar{G}$(r,r')=G(r) where r=|r−r'|, is the scalar Green's function that has a Weyl expansion:

$$\frac{e^{jk_0 r}}{r} = \frac{1}{j2\pi} \int du \frac{e^{-j(u\cdot x + \eta|z|)}}{\eta} \tag{6}$$

with wavenumber vectors in lateral (u=($k_x$, $k_y$)) and axial ($\eta = \sqrt{k_0^2 - |u|^2}$) directions. $k_0$ is the wavenumber of the isotropic background medium. This expansion is generally easier to work with when representing the object in both lateral frequency and axial space domain is preferred.

In addition, the inventors made the assumption that the sample being imaged is homogeneous, which is usually assumed for many types of crystals and biological samples. The permittivity matrix was then symmetric and able to be decomposed into:

$$\bar{\bar{\epsilon}} = \begin{bmatrix} \cos\theta & \sin\theta \\ -\sin\theta & \cos\theta \end{bmatrix} \begin{bmatrix} \epsilon_e & 0 \\ 0 & \epsilon_0 \end{bmatrix} \begin{bmatrix} \cos\theta & -\sin\theta \\ \sin\theta & \cos\theta \end{bmatrix} \tag{7}$$

The variables $\epsilon_0$ and $\epsilon_e$ represent the permittivity values along the ordinary and extraordinary axes, respectively. The parameter $\theta$ is the angle between the principle axis and the extraordinary axis (also known as the slow axis). The elements in equation (4) are then renamed as:

$$\begin{cases} \epsilon_1 = \epsilon_{xx} \\ \epsilon_2 = \epsilon_{yy} \\ \epsilon_3 = \epsilon_{xy} = \epsilon_{yx} \end{cases} \tag{8}$$

Since the inventors used a left circularly polarized illumination for this testing, the inverse scattering potential becomes:

$$\begin{bmatrix} V_1 & V_3 \\ V_3 & V_2 \end{bmatrix} \begin{bmatrix} 1 \\ j \end{bmatrix} = \begin{bmatrix} V_1 + jV_3 \\ V_3 + jV_2 \end{bmatrix} \tag{9}$$

where $$\begin{cases} V_1 = 4\pi k_0^2(\epsilon_1 - \epsilon_0) & (10a) \\ V_2 = 4\pi k_0^2(\epsilon_2 - \epsilon_0) & (10b) \\ V_3 = 4\pi k_0^3\epsilon_3 & (10c) \end{cases}$$

Two further assumptions were made with respect to the illumination and scattering processes. The first assumption is that the illumination from each LED at the sample plane is a plane wave. The second assumption involves utilizing a weak object assumption that ignores the second-order scattering term. Furthermore, the inventors disregard pupil aberration and model that as a low-pass filter P (u) with a cutoff frequency based on the numerical aperture of the objective lens. Alternatively, a Jones matrix can be used for the correction of anisotropic aberration by jointly reconstructing the pupil. Based on these assumptions, the forward model can be expressed as:

$$\tilde{I}^{l,m}(u, z = 0) \approx \tag{11}$$

$$\tilde{I}_0^{l,m}(u, z = 0) + \int \left[ H_{Re}^m(u, z) \cdot \tilde{V}_{Re}^l(u, z) + H_{Im}^m(u, z) \cdot \tilde{V}_{Im}^l(u, z) \right] dz$$

where $\tilde{I}^{l,m}(u, z)$ and $\tilde{I}^{l,m}(u, z)$ are a 2D Fourier transform of the measurement and DC term from $m^{th}$ LED illumination analyzed by the $l^{th}$ polarizer, respectively.

$$H_{Re}^m(u, z) = \frac{jk^2}{2} S(u_m) \left\{ P * (-u_m) \frac{e^{-j[\eta_i + \eta(u - u_m)]z}}{\eta(u - u_m)} P(u - u_m) - \right. \tag{12}$$

$$\left. P(-u_m) \frac{e^{j[\eta_i + \eta(u - u_m)]z}}{\eta(u - u_m)} P(-u - u_m) \right\}$$

and

-continued $$H_{Im}^m(u, z) = \frac{-k^2}{2} S(u_m) \left\{ P * (-u_m) \frac{e^{-j[\eta_i + \eta(u - u_m)]z}}{\eta(u - u_m)} P(u - u_m) - \right. \tag{13}$$

$$\left. P(-u_m) \frac{e^{j[\eta_i + \eta(u - u_m)]z}}{\eta(u - u_m)} P(-u - u_m) \right\}$$

are the diffractive transfer functions in frequency and space for the real and imaginary part of the scattering potential under $m^{th}$ LED illumination with shape $S^m(u')$. Since each LED has a very small die area (e.g., <170 μm in diameter), the inventors represent the die area as a delta function. $I \in \{0°, 45°, 90°, 135°\}$. $\tilde{V}_{Re}^l(u, z)$ and $\hat{V}_{Im}^l(u, z)$ are 2D Fourier transforms of $V_{Re}^l(r)$ and $V_{Im}^l(r)$ along lateral directions at depth $z$, respectively, and are related to Equation (10) via:

$$V_{Re}^{0°}(r) + jV_{Im}^{0°}(r) = V_1(r) + jV_3(r) \tag{14a}$$

$$V_{Re}^{45°}(r) + jV_{Im}^{45°}(r) = \frac{\sqrt{2}}{2}(V_1(r) + V_3(r)) + j\frac{\sqrt{2}}{2}(V_2(r) + V_3(r)) \tag{14b}$$

$$V_{Re}^{90°}(r) + jV_{Im}^{90°}(r) = V_3(r) + jV_2(r) \tag{14c}$$

$$V_{Re}^{135°}(r) + jV_{Im}^{135°}(r) = \frac{\sqrt{2}}{2}(-V_1(r) + V_3(r)) + j\frac{\sqrt{2}}{2}(V_2(r) + V_3(r)) \tag{14d}$$

which are scattering potential components corresponding to each analyzer angle. $V_{1,2,3}(r)$ are complex variables that may have imaginary parts; hence, the above equation does not imply $\hat{V}_{Re}(r)=V_1(r)$, for example.

For concise expression, the inventors defined a new variable $v \in \mathbb{C}^{N \times M \times T \times 3}$ representing all the potentials $V_1(r)$, $V_2(r)$, and $V_3(r)$, where N,M,T are width, height, and depth of the 3D sample, respectively. Further, the inventors introduced the operator $\mathcal{A}^{l,m}(\bullet)$ as the forward model for the sample illuminated by the $m^{th}$ LED and analyzed by the $l^{th}$ linear polarizer. To reconstruct the permittivity matrix, the inventors formulated the inverse problem as:

$$v = \underset{v}{\text{argmin}} \ \mathcal{L}(v) \tag{15}$$

with the loss function:

$$\mathcal{L}(v) = \sum_l \sum_m \left\| \mathcal{A}^{l,m}(v) - \tilde{I}^{l,m}(u, z) \right\|_2^2 + \gamma tv(v) \tag{16}$$

$tv(\bullet)$ is the isotropic total variation operator. $\gamma$ is a regularization parameter empirically set to be $1 \times 10^{-6}$ for all experiments. The forward model is implemented in Pytorch and the loss function is optimized using a stochastic gradient descent method with Nesterov momentum acceleration.

Subsequently, the inventors extract polarization properties of interest, such as orientation and birefringence from T²oFu reconstructions $\epsilon_{1,2,3}$. The permittivity of ordinary and extraordinary axes can be computed as:

$$\begin{cases} \epsilon = \bar{\epsilon} - 1/2\Delta\epsilon & (17a) \\ \epsilon_\epsilon = \bar{\epsilon} - 1/2\Delta\epsilon & (17b) \end{cases}$$

and the refractive index along the ordinary and extraordinary axes $n_{o,e}=\sqrt{\epsilon_{o,e}}$ can be further derived, along with the averaged refractive index ($\bar{n}=n_o+n_e$) and birefringence ($\Delta n=n_e-n_o$). Moreover, the orientation to the slow axis is computed as:

$$\theta = \begin{cases} \frac{1}{2}\arctan 2\epsilon_3/\epsilon_1 - \epsilon_2, & \text{if } \epsilon_1 - \epsilon_2 > 0 \\ \frac{1}{2}\arctan 2\epsilon_3/\epsilon_1 - \epsilon_2 + \frac{\pi}{2}, & \text{otherwise.} \end{cases} \quad (18)$$

Experimental Results

To validate the performance of the proposed method, the inventors showed results from a variety of calibration targets. Due to the lack of commercially available high-resolution 3D polarization phantom, the inventors validated different aspects separately. The inventors then showed reconstructions of a single fixed muscle fiber. Finally, the inventors showed reconstructions of a tissue section sample from a human heart biopsy that is predictive for lethal cardiac amyloidosis. FIGS. 7A-10D were captured and reconstructed using a 20×, 0.4 NA system, and FIGS. 11A-11F were recorded and processed with a 10×, 0.25 NA system.

Tomographic Reconstruction

The inventors demonstrate tomographic reconstructions of averaged refractive index n and birefringence $\Delta n$ from isotropic and anisotropy calibration samples. These results are acquired with a 20× objective lens (0:4NA, Olympus Corporation, Japan) imaging system. FIG. 7A illustrates the image captured with center LED illumination when the imaging system is focused at the middle of a polystyrene microsphere sample. The sample is made of two layers of 3 µm-diameter microspheres immersed in n=1:575 oil. FIG. 7B illustrates images taken with center LED illumination when focused at different depths. The arrows in FIG. 7B highlight the microspheres that are in focus, suggesting two layers of microspheres are placed at −7 µm and 5 µm planes. Note that since the refractive index of polystyrene (n=1:60 @ 520 nm) is very close to the background medium, the contrast of in-focus microspheres is very low. FIGS. 7C and 7D show the reconstructed refractive index and birefringence at two different depths. The accuracy of the tomographic depth reconstruction is validated with images displayed in FIG. 7B. Since polystyrene is an isotropic material, the reconstruction shows no anisotropy properties except on the edge, which agrees with the well-recognized edge birefringence phenomena. FIG. 7E shows the cross-sections of the reconstructed refractive index and birefringence. FIG. 7F plots the profile of the reconstructed birefringence and refractive index averaged across 10 microspheres.

Figures 8A, 8B, 8C:
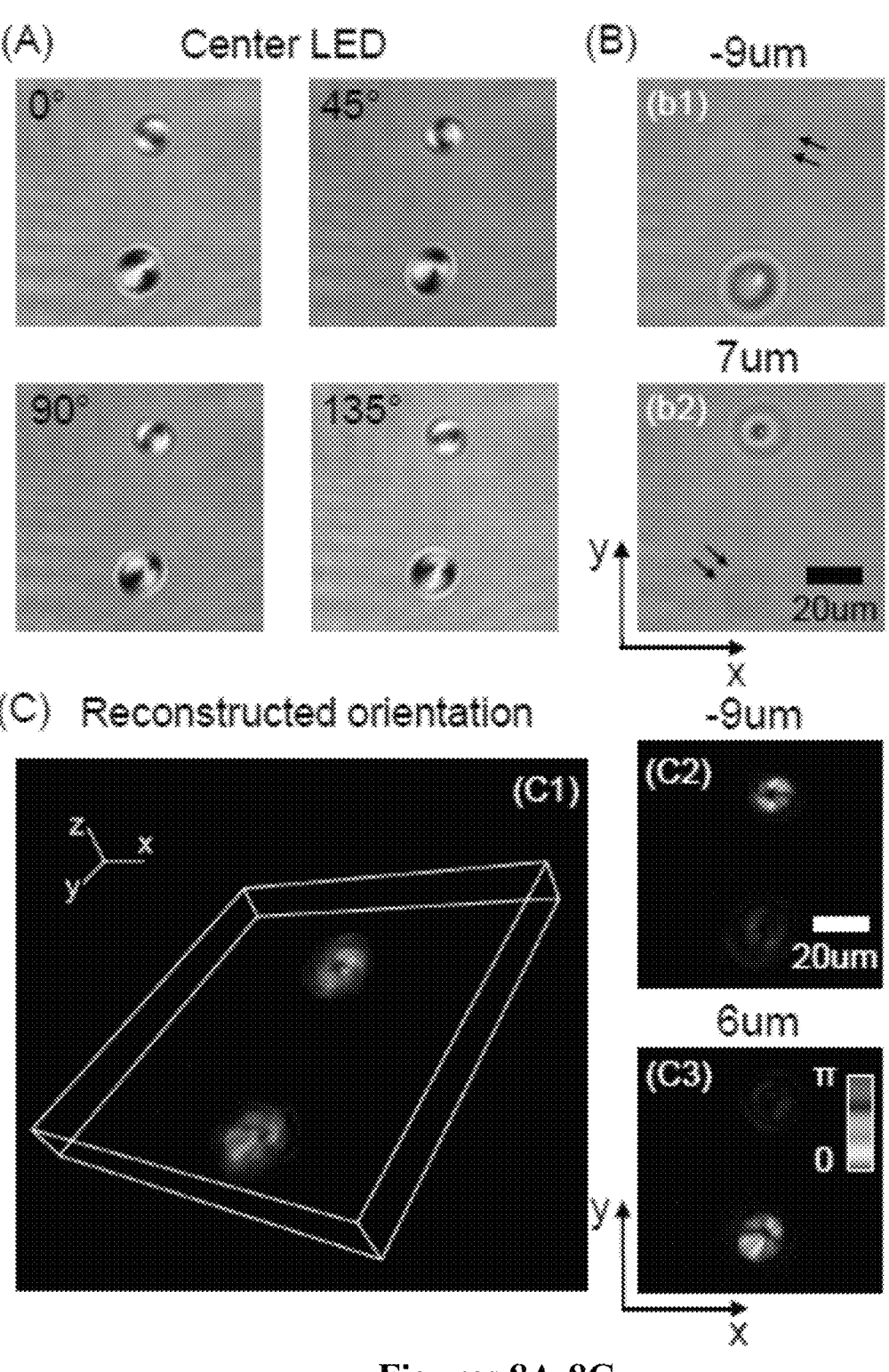
FIGS. 8A-8C illustrate tomographic Fourier ptychography reconstruction images of potato starch grain.

In addition, the inventors showed reconstructions of an anisotropic potato starch sample in FIG. 8A-8C. The sample consists of two potato starch grains immersed in n=1:515 oil at different depths. FIG. 8A depicts captured intensity images illuminated with the center LED at four different polarizations. The spiral patterns imaged with different polarization differs from each other noticeably. Similarly, FIG. 8B shows images when the system is focused at different depths of the sample. The black arrows point at grains that are in focus, suggesting the two potato starch grains are suspended at −9 µm and 6 µm. FIG. 8C shows the reconstructed orientation and birefringence. To best visualize the results, the inventors followed the convention to display this multidimensional data using an HSV colormap, where saturation is set to one, value is associated with birefringence, and orientation is coded in hue. The reconstructed structures agree with starch grain reconstructions reported in previous holography-based literatures.

Orientation Measurement

Figures 9A, 9B:
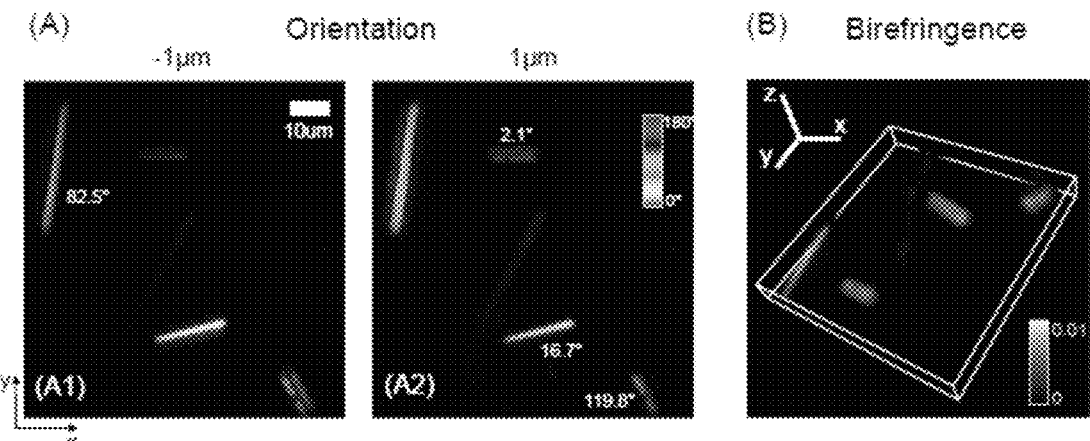
FIGS. 9A and 9B illustrate tomographic Fourier ptychography reconstructions of monosodium urate crystals.

To verify the accuracy of the reconstructed orientation, the inventors tested the above-described method on a sample made with monosodium urate (MSU). MSU are needle-shaped crystals precipitated from uric acid that could trigger robust inflammation such as acute arthritis and other immune activations that cause severe pain in patients. FIG. 9A displays the reconstructed birefringence and orientation at two slightly different depths. These results were also obtained with a 20× objective imaging system and suggest that the reconstructed orientation values of line-shaped MSU crystals follow the structural direction (labeled next to each MSU crystal). This is in agreement with reconstruction results from LC-PolScope-based methods. Additionally, FIG. 9B presents a 3D rendering of the reconstructed birefringence.

Muscle Fiber Assessment

Figures 10A, 10B, 10C, 10D:
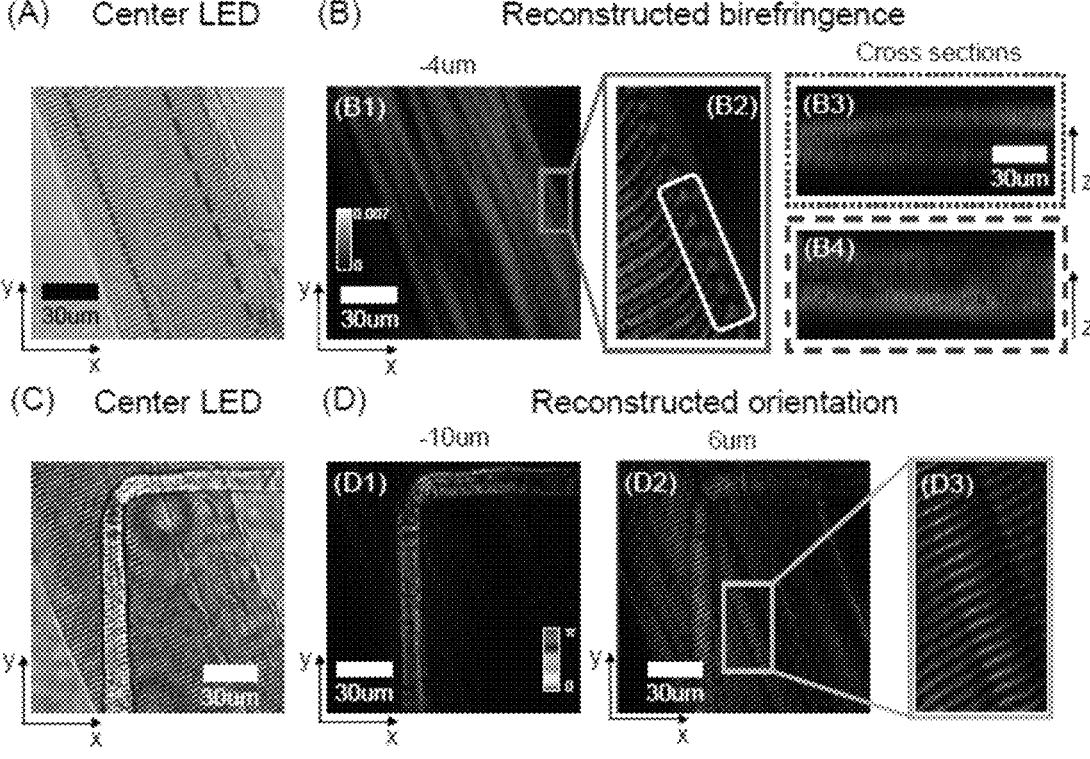
FIGS. 10A-10D illustrate tomographic Fourier ptychography reconstructions of muscle fiber.

High contrast and high-resolution structural imaging of intrinsic signals in muscle skeletal fibers is an important task for the rapid detection of changes in myofibrillar organization that can lead to skeletal myopathies. Currently, 3D muscle tissue is typically imaged by complex and expensive systems, such as second harmonic generation (SHG) microscopy. SHG exploits the contrast of polarization properties from the non-linear susceptibility in molecules like myosin, by using high-power, ultra-short pulsed lasers in a point scanning configuration. Here the inventors show 3D T2oFu reconstruction results of an isolated healthy muscle fiber using our inexpensive, LED-based and scanning-free system. FIG. 10A shows an image of a muscle fiber captured with center LED illumination. FIG. 10B shows a volumetric reconstruction of the muscle fiber. The cross sections of regions highlighted in FIG. 10A are depicted. FIG. 10C shows an image of the same muscle fiber from a different field of view, where a non-muscle fiber with a ninety-degree bend is placed below the muscle fiber. FIG. 10D depicts reconstructed orientation and birefringence at two different depths, showing the regular pattern of a healthy muscle fiber. The zoom-in region highlights the muscle grains with consistent orientations. The reconstruction shows a change in orientation at the bend of the non-muscle fiber (D1), while the orientation of the muscle fiber remains constant. Furthermore, the spatial resolution of the reconstruction is sufficient to clearly resolve the muscle filaments (D3).

Imaging Cardiac Amyloidosis

Figures 11A, 11B, 11C, 11D, 11E, 11F:
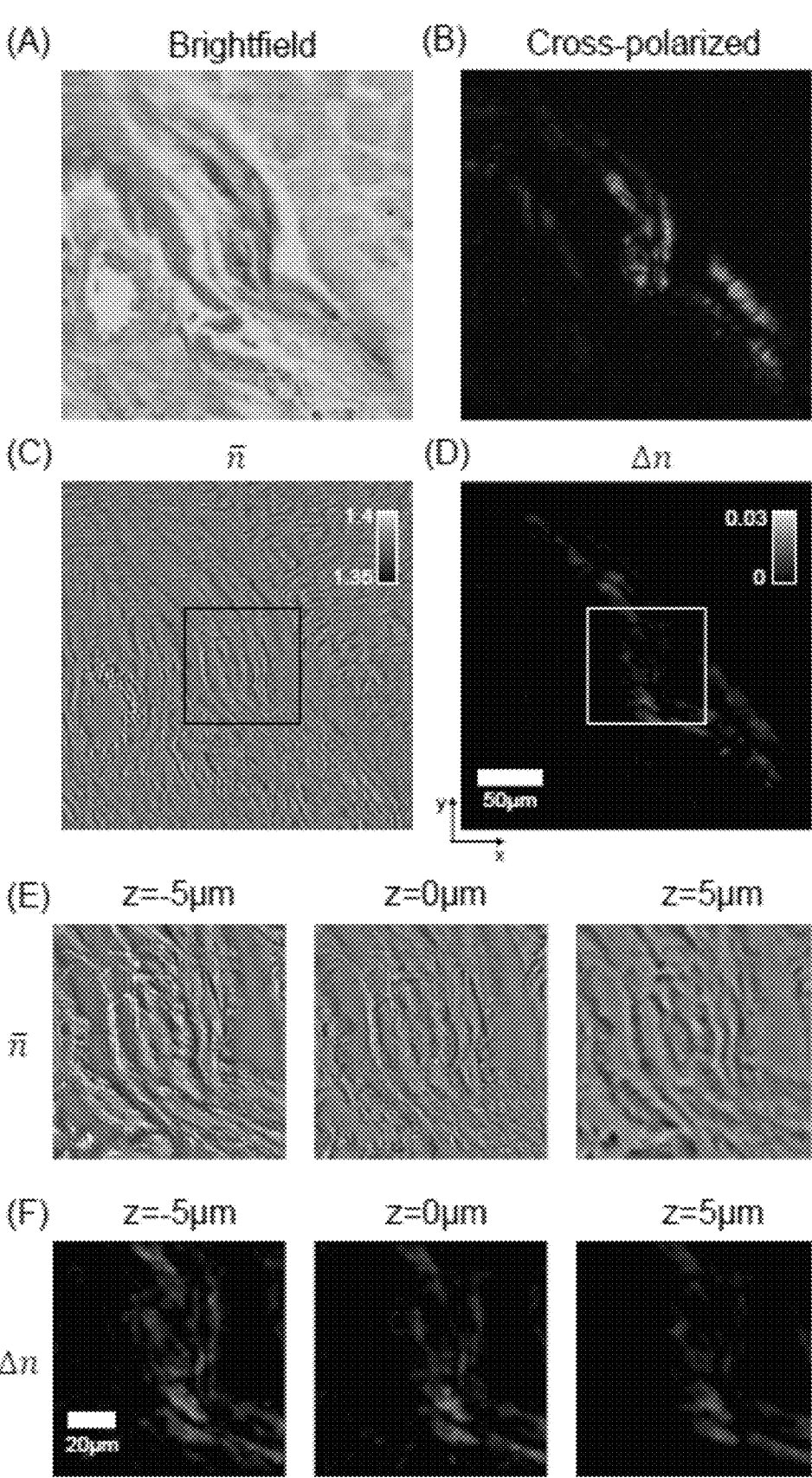
FIGS. 11A-11F illustrate tomographic Fourier ptychography reconstructions of a heart tissue sample with cardiac amyloidosis.

The inventors also applied the above-described method to image a heart tissue sample that has cardiac amyloidosis. Cardiac amyloidosis is a lethal disease that affects more than 12,000 patients in the US alone with <5% 10-year survival rate. In current practice, the biopsied tissue is first frozen and thinly sliced, then stained with a congo red-colored dye and inspected under a cross-polarized microscope. FIG. 11A shows the brightfield image. FIG. 11B shows the same region, imaged with a cross-polarized color microscope. The vibrant apple green color suggests mostly likely amyloid protein has built up inside the tissue sample. FIGS. 11C and 11D depict the reconstructed refractive index and birefringence, while zoom-ins of the boxed region at different depths are shown in FIGS. 11E and 11F. Since the sample is thinly sliced, the inventors did not observe noticeable structural changes in different layers. However, the structure of the birefringence reconstruction is correlated with the color-stained cross-polarized image, which may be useful for rapid on-site inspections.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A Fourier ptychography system, comprising:
a polarization-sensitive camera positioned for capturing a sequence of polarized images of a sample;
an objective lens positioned in a light path between the polarization-sensitive camera and the sample;
an array of light sources for directing light to the sample;
a generator polarizer positioned between the array of light sources and the sample to polarize light directed to the sample from the array of light sources; and
a computing system coupled to the polarization-sensitive camera and configured to create a tomographic Fourier ptychography image by:
receiving, from the polarization-sensitive camera, the sequence of polarized images of the sample in the light path that passes through the generator polarizer, the sample, and the objective lens, wherein each polarized image of the sequence of polarized images overlaps another polarized image of the sequence of polarized images;
stitching each image of the sequence of images together using a non-linear Fourier transform function to create a composite image; and
outputting the composite image as the tomographic Fourier ptychography image.

2. The system of claim 1, wherein the generator polarizer is a left-circular polarizer.

3. The system of claim 1, wherein the generator polarizer is a generator polarizer array.

4. The system of claim 3, wherein the generator polarizer array is optimized based on a type of the sample.

5. The system of claim 3, wherein the generator polarizer array is configured to provide a plurality of polarization states.

6. The system of claim 5, wherein the plurality of polarization states comprise birefringence, di-attenuation, and orientation.

7. The system of claim 1, further comprising a tube lens positioned between the objective lens and the polarization-sensitive camera.

8. The system of claim 1, wherein the array of light sources is an LED array.

9. The system of claim 8, further comprising a controller configured to sequentially turn on LEDs of the LED array.

10. The system of claim 8, further comprising a voltage level shifter to adjust voltage applied to the LED array.

11. The system of claim 1, wherein the polarization-sensitive camera comprises:
a microlens array;
a sensor; and
a wire-grid polarizer positioned between the microlens array and the sensor.

12. The system of claim 1, further comprising a data interface for outputting the sequence of polarized images of the sample.

13. A method of creating a tomographic Fourier ptychography image, comprising:
receiving, from a polarization-sensitive camera, a sequence of polarized images of a sample in a light path that passes through a generator polarizer, the sample, and an objective lens, wherein each polarized image of the sequence of polarized images overlaps another polarized image of the sequence of polarized images;
stitching each image of the sequence of images together using a non-linear Fourier transform function to create a composite image; and
outputting the composite image as the tomographic Fourier ptychography image.

14. The method of claim 13, wherein each polarized image of the sequence of polarized images includes a mix of at least four different polarized light amplitudes.

15. The method of claim 14, further comprising de-mixing each polarized image of the sequence of polarized images for an amplitude of each of the four different polarized light amplitudes.

16. The method of claim 13, wherein stitching each polarized image of the sequence of polarized images together using the non-linear Fourier transform function comprises:
measuring an amplitude of each polarized image of the sequence of polarized images;
estimating a guess amplitude and a guess phase for each polarized image of the sequence of polarized images in a Fourier space;
generating a simulated image by using the guess amplitude and the guess phase for each polarized image of the sequence of polarized images using an inverse Fourier transform function;
updating the simulated image by replacing the guess amplitude with the measured amplitude for each polarized image of the sequence of polarized images; and
reverting the updated simulated image to the Fourier space by applying a Fourier transform to the updated simulated image for each polarized image of the sequence of polarized images.

17. The method of claim 16, wherein applying the Fourier transform to the updated simulated image for each polarized image of the sequence of polarized images correspondingly updates the guess phase and the measured amplitude from the updated simulated image.

18. The method of claim 17, further comprising:
iteratively repeating the generating step, the updating step, and the reverting step until the sequence of polarized images converges as a high-resolution composite image,
wherein, in the iteratively repeating generating step, a prior updated measured amplitude is used as the guess amplitude and a prior updated guess phase is used as the guess phase.

19. The method of claim 13, wherein each polarized image of the sequence of polarized images overlaps another polarized image of the sequence of polarized images by at least 75%.

20. The method of claim 13, wherein the composite image is three-dimensional.

* * * * *